Patented June 13, 1939

2,162,225

UNITED STATES PATENT OFFICE 2,162,225

VARNISH

Jean R. L. Martin, New York, N. Y.

No Drawing. Application April 16, 1937,
Serial No. 137,213

1 Claim. (Cl. 134—79)

My invention relates to protective coatings especially adapted for oil paintings or other surfaces where the preservation of color values in the protected surface is of prime importance.

An object of the invention is to provide a varnish or lacquer for such surfaces which will cause the minimum of alteration in the colors underneath, which will not darken with age, which will be free from cracking or checking, which will remain permanently supple, and will afford complete protection against humidity. Another object is to provide against fading of protected colors due to ultra violet rays.

There is not, so far as I know, a satisfactory varnish on the market for protecting oil paintings. The best available are composed mainly of gum dissolved in a drying oil and have a decided color of their own even when new, and they darken with age. These varnishes also harden more or less after drying and after varying periods of time will, for unknown reasons, peel or crack. At best, they are an imperfect protection against humidity and other atmospheric agents. When these varnishes fail and have to be removed and replaced, it is a delicate, tedious, and expensive operation, requiring the most skilled technician.

The darkening with age is common to all these varnishes, even the best, and has always been taken as a matter of course and accepted as inevitable. It is a serious drawback, as it destroys the original freshness of the colors and their relative values.

I have found that a varnish comprising the following ingredients in a suitable solvent is free from practically all the defects above mentioned:

Ethyl cellulose
      Cooked linseed oil
      Copal gum
      Castor oil

In the preferred form of my invention, I add also an esculin or quinine salt or other chemical to act as an absorbing screen for ultra violet light so as to protect the colors beneath the varnish from fading. Other examples of chemicals suitable for this purpose are menthyl salicylate and menthyl anthranilate.

In compounding the varnish, some other suitable gum may be used in place of copal and plasticizers other than castor oil may be employed if desired. Drying oils other than cooked linseed oil, of which several are known, may also be used. The combination of the ethyl cellulose and the drying oil, however, is characteristic of the composition and the relative amounts used are important. Exhaustive tests show that if less than about one part oil to ten parts ethyl cellulose is used, the varnish film will not stick to such a surface as that of an oil painting, and if more than about four parts oil to ten parts ethyl cellulose are used, oil separates from the film and spoils it. I am aware that it has been proposed to improve ordinary drying oil varnishes by adding a relative small amount of a cellulose compound, but in these the proportion of oil has been large so as to constitute in effect a solvent for the cellulose compound, thereby avoiding the separation of the oil above mentioned. Any varnish in which the oil is so predominant an ingredient would have all or most of the faults above discussed if used as a protective coat for oil paintings or like purposes.

Some variation in the proportion of the ingredients above named may be tolerated without losing the characteristics which make it useful for the purposes intended, but the following formula has been found to give good results:

| | Per cent |
|---|---|
| Ethyl cellulose | 60 |
| Cooked linseed oil | 20 |
| Copal gum | 7.5 |
| Castor oil | 7.5 |
| Menthyl salicylate | 5 |

A suitable dissolving medium for these ingredients may be composed of substantially equal parts of butyl alcohol, toluol, cellosolve acetate and isopropanol, although other known solvents such as xylol, benzol, etc., may be used. In preparing the compound with the solvent specifically mentioned above, the ethyl cellulose is dissolved in a mixture of cellosolve acetate and toluol. After dissolution the isopropanol is added. The gum is dissolved in the butyl alcohol, the solution filtered and then added to the ethyl cellulose solution prepared as just described. The castor oil and drying oil are added last. This procedure has been found to give no trouble. With a procedure differing substantially from this, difficulty may be encountered in obtaining a perfect incorporation of the drying oil, although the time of adding the castor oil is not of particular importance.

A varnish such as above described will give a practically colorless coating on a painting, which will not darken with age, thus keeping the colors in their original brilliance and proper relation; a coating which will adhere firmly to the non-porous surface, which will remain fully pliable for an indefinite period, permitting the canvas to be rolled without injuring the surface, which will not crack or chip, which will afford complete protection against humidity and which will protect the colors from fading due to ultra violet rays.

What I claim and desire to protect by Letters Patent is:

A varnish for the preservation of oil paintings and the like comprising ethyl cellulose, substantially 60%, a drying oil, substantially 20%, copal gum, substantially 7.5%, and a plasticizer, substantially 7.5%.

JEAN R. L. MARTIN.